Patented Dec. 23, 1947

2,433,015

UNITED STATES PATENT OFFICE 2,433,015

REACTION OF ETHYLENE WITH ORGANIC CARBOXYLIC ACIDS

John R. Roland and Jesse Harmon, Wilmington, Del., assignors to E. I. du Pont de Nemours & Company, Wilmington, Del., a corporation of Delaware No Drawing. Application March 17, 1945, Serial No. 583,394

14 Claims. (Cl. 260—413)

This invention relates to olefin reactions and particularly to a process for reacting olefins such as ethylene with organic carboxylic acids. It also relates to new compositions of matter which may be prepared by reaction between ethylene and organic carboxylic acids. This application is a continuation-in-part of our copending application S. N. 532,219, filed April 21, 1944, in which we disclose that long-chain carboxylic acids can be prepared from ethylene and carboxylic acid anhydrides.

The type of reaction with which this invention is concerned is essentially a polymerization of the olefin in the presence of a reactant, one molecule of which supplies both end groups for the long chain or modified polymeric molecule. For convenience, such a reaction may be referred to as "telomerization" and the modified polymeric products as "telomers." In the copending application of W. E. Hanford and J. R. Roland, S. N. 471,028 filed January 1, 1943, now U. S. Patent 2,402,137, it is disclosed that ethylene undergoes a "telomerization" reaction with various saturated organic oxygen-containing materials in the presence of certain catalysts which are considered to be effective as sources of free radicals, namely, peroxides, persulfates, oxygen, perborates, percarbonates, hydrazines, tetraethyl lead, hexachloroethane and the like. This kind of reaction is, of course, entirely unlike the ordinary esterification of carboxylic acids by reaction with olefins, which occurs in the presence of strongly acidic or metal halide types of catalyst.

An object of this invention is to provide an improved process for reacting ethylene with organic carboxylic acids. Another object is to provide mixtures of long-chain carboxylic acids which have numerous useful properties. A more particular object is to provide a method for introducing a polyethylene chain into organic carboxylic acids having at least one hydrogen atom attached to an alpha carbon atom.

These and other objects are accomplished in accordance with this invention by heating ethylene with an organic carboxylic acid free of olefinic and acetylenic unsaturation, and having at least one alpha-hydrogen atom, in the presence of a catalyst of the kind to be hereinafter disclosed. When ethylene is employed as the sole olefinic reactant, the reaction which occurs in accordance with the invention may be written as follows:

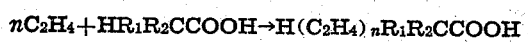

in which $R_1$ and $R_2$ represent hydrogen, monovalent hydrocarbon groups free of olefinic and acetylenic unsaturation, and carboxyl-substituted monovalent hydrocarbon groups free of olefinic and acetylenic unsaturation, and $n$ is an integer, preferably having an average value of from 6 to 50 or more.

The acids used for reaction with ethylene in this invention may be any of the organic carboxylic acids which contain at least one alpha-hydrogen atom, which are free of olefinic and acetylenic unsaturation, and which preferably contain only carbon, hydrogen and oxygen. More specifically, the acids useful in the practice of this invention include acetic, propionic, butyric, isobutyric, valeric, and higher alkanoic acids containing at least one alpha-hydrogen atom such as octanoic, decanoic, lauric and myristic and even higher acids. Branched-chain carboxylic acids, though less readily available, are of similar utility in this invention if they conform to the definition given above. As such may be mentioned butane-2-carboxylic acid and pentane-3-carboxylic acid. Di- and polybasic acids may also be used in carrying out the reaction of this invention if they also conform to the limitations set forth above. Suitable examples of such acids are succinic, glutaric, adipic, sebacic, and tri-carballylic acids. In view of the greater ease of availability, it is generally preferred to practice this invention with the lower molecular weight acids described, particularly with those which contain less than 7 carbon atoms.

The reaction of ethylene with organic carboxylic acids according to this invention is sensitive to impurities or inhibitors, and it is therefore especially desirable that the acids be prepared or purified to rigid requirements.

The ratios of ethylene to carboxylic acid in the initial reaction mixture may be varied widely. The preferred ratios in batchwise operation are from about 1:8 to about 1:1.12 by weight, although still wider ratios of reactants, including the range from about 1:30 to about 1:0.1, are operable. In a continuous process virtually any ratio of reactants may be employed. Control of the ratio of reactants is important since it affects the average molecular weight of the product. For example, ethylene: isobutyric acid ratios of 1:8 and 1:1 yield products whose average molecular weights are about 130 and 730 respectively. Small amounts of acids containing only one combined ethylene unit per molecule of the initial carboxylic acid reacting are sometimes present in the products, although the major part of the product generally is made up of acids containing a larger number of combined ethylene units.

The carboxylic acid reactant is preferably used in the absence of solvents or diluents. However, a diluent or solvent may be used, in which case it is preferable to employ materials which do not themselves react with ethylene. For this purpose materials which are free of secondary and tertiary hydrogen atoms are preferred, such as tert.-butyl methyl ether, methyl pivalate, benzene, and chlorobenzene. Highly-branched and sterically-hindered compounds, even if they contain secondary or tertiary hydrogens, may also be used. Isooctane, pentamethylethane, etc. are such compounds.

This reaction can be applied to any polymerizable monoolefinic hydrocarbon preferably one containing less than five carbon atoms. Ethylene is the preferred olefin for use in the practice of this invention and should be the major component of olefinic gas used in the practice thereof. The ethylene may contain small quantities of ethane, propane, nitrogen, hydrogen, carbon dioxide or oxygen. Oxygen in high concentrations, for example, in excess of 1000 parts per million is generally deleterious to the reaction. Ethylene containing smaller amounts of oxygen, however, less than 100 P. P. M. generally less than 50 P. P. M. and preferably less than 10 P. P. M., is employed since these concentrations have only minor effects on the yields and molecular weights of the products produced. Under proper conditions of temperature, oxygen is a catalyst for the reaction of ethylene with organic carboxylic acids, and for this purpose it is generally preferred to maintain its concentration at about 10, or, better at 2 to 5 parts per million. Commercial grades of ethylene frequently contain various impurities, and it is generally desirable to purify the ethylene to attain low concentrations of all contaminants, particularly oxygen and acetylene. Ethylene is conveniently purified by distillation, by catalytic removal of contaminants, or by scrubbing.

As catalysts for inducing the reaction of the present invention, there may be used any catalyst which, in the absence of the carboxylic acid reactant, will convert ethylene, by the application of heat and pressure, to a solid polymer of ethylene. In general, these catalysts are substances (or mixtures of substances) which yield free radicals under the conditions of the reaction. A number of these catalysts have been grouped together under the term "peroxidic systems" (cf. Gilman, "Organic Chemistry, An Advanced Treatise," volume II, page 1924 et seq.).

In the practice of the invention temperatures of about 50° to 400° C. are generally used, good results being obtained at 150° to 300° C. In preferred embodiments, the optimum temperature employed depends on the pressure and contact time, but is more particularly determined by the specific nature of the catalyst. When oxygen or a peroxy compound is employed, temperatures within the range of 60° to 300° C. are generally used, although relatively high temperatures within the aforesaid range give best results when the catalyst used is oxygen. The following list sets forth examples of numerous catalysts used in practicing the invention, and states the appropriate optimum temperature range corresponding to each of these catalysts: organic peroxy compounds (60° to 180° C.) such as benzoyl peroxide (60° to 100° C.), acetyl peroxide (50° to 80° C.), propionyl, butyryl, lauroyl, and acetyl benzoyl peroxides (all at 60° to 100° C.) dimethyl peroxide, diethyl peroxide, dipropionyl peroxide, benzaldehyde peroxides (all at 120° to 180° C.); hydrazine compounds such as hydrazine sulfate, hydrazine hydrochloride, dibenzoylhydrazine, semicarbazide hydrochloride, (all at 200° to 300° C.); perhalo compounds such as hexachloroethane, octachloropropane (175° to 300° C.); per salts such as alkali metal and ammonium persulfate, perborates and percarbonates (all at 50° to 80° C.); organometallic compounds such as tetraethyl lead, (150° to 250° C.); oxygen, especially at 2 to 10 parts per million, (175° to 300° C.), ultraviolet light with photosensitizers, such as biacetyl, mercury, alkyl iodides, and acetone (25° to 75° C.); and positive halogen compounds such as potassium chlorate plus manganese dioxide, sodio N-chloro-p-toluenesulfonamide, calcium hypochlorite, N-chloroamides, N-chloroalkanesulfonamides, N-chlorourea (all at 175° to 300° C.). These catalysts are generally used in amounts from 0.001% to 0.5% by weight based on the total reactants. While it is generally not necessary, larger amounts of catalysts (up to 1%, or even 5%) may be used, especially if extremely high rates of reaction are desired.

The above-listed telomerization catalysts are ineffective as catalysts for the Friedel-Crafts type reactions, and thus differ from the Friedel-Crafts type catalysts such as aluminum chloride, boron trifluoride, sulfuric acid and hydrofluoric acid.

Superatmospheric pressure is used in carrying out the process of this invention. Pressure and temperature are inversely interdependent variables, that is, within the limits given, high reaction temperatures generally permit the use of lower reaction pressures whereas low reaction temperatures generally require relatively high pressures for a comparable ration of reaction. In order to obtain a high yield, and a high space-time yield, the process is generally operated at a pressure of 100 atmospheres to 2000 atmospheres, or even higher. Pressures in the range of 500 to 1500 atmospheres are readily obtained, and are quite satisfactory for most purposes. From the foregoing discussion, in the light of the specific examples, one skilled in the art can readily ascertain optimum or near optimum conditions of temperature and pressure to apply to a chosen system. Other factors being equal, an increase in temperature makes for a decrease in the average molecular weight of the acid product while an increase in ethylene pressure makes for an increase in the average molecular weight.

The equipment used in the practice of this invention may be fabricated of, or lined with, suitable inert materials, such as stainless steel, silver, lead, tin, or glass.

In the following examples, the reaction vessel employed is a high pressure shaker tube of 400 c. c. capacity. All parts are given in weight in c. g. s. units unless otherwise stated.

*Example 1.*—A stainless steel-lined, high-pressure tube is charged with 100 parts of propionic acid and 0.2 part of benzoyl peroxide. The vessel is then closed, pressured with ethylene, and the heating and shaking are started. During a reaction time of 17.75 hours, throughout which the temperature is maintained at 70° to 82° C. in the pressure range at 895 to 950 atmospheres, there is a total observed pressure drop of 55 atmospheres. After cooling, the vessel is bled of excess ethylene, opened and the contents discharged. Unreacted propionic acid is separated and there is obtained a soft pasty acid. This has an acid number of 75.8 which corresponds to an average molecular weight of 740 (i. e. about 24 ethylene units per unit of propionic acid). Alkaline solutions of this acid form, wet sulfur and show good surface-active properties.

Example 2.—A silver-lined high-pressure reaction vessel is charged with 200 parts of isobutyric acid and 0.2 part of hexachloroethane. The vessel is closed, pressured with ethylene and the reactants heated at 238° to 250° C. under a pressure of 700 to 1025 atmospheres for 3.25 hours. During this time the pressure drop totals 450 atmospheres. This reaction mixture yields 143 parts of unreacted isobutyric acid and 50 parts of a long-chain acid mixture which has an acid number of 361.2 and an iodine number of 3.3 This analysis indicates an average molecular weight of 155 and corresponds to an acid containing an average of 8.8 carbon atoms (i. e. 2.4 ethylene units per unit of isobutyric acid). The low iodine number demonstrates the substantial absence of unsaturated groups.

Example 3.—A silver-lined reaction vessel is charged with 200 parts of isobutyric acid and 0.2 part of dibenzoylhydrazine. This is then heated under ethylene pressure of from 850 to 1000 atmospheres at 245° to 252° C. for 14.25 hours. During this time the total observed pressure drop amounted to 1310 atmospheres. The unreacted isobutyric acid is distilled from the reaction mixture, leaving a residue of 94 parts of a fatty acid mixture which has an acid number of 197.3. This acid number indicates an average molecular weight of 284 and corresponds to an acid containing an average of 18 carbon atoms (i. e. 7 ethylene units per unit of isobutyric acid).

Example 4.—A silver-lined reaction vessel is charged with 200 parts of adipic acid and 0.2 part of dibenzoylhydrazine. This is heated under ethylene pressure of from 500 to 1000 atmospheres at 246° to 251° C. for 15.25 hours. The reaction mixture is separated by fractional solution in alcohol to give 4 fractions; (a) the least soluble fraction amounts to 7 parts of an acid mixture whose acid number indicates an average molecular weight of 440. Two more soluble fractions (b) and (c), and an oily residue (d) amount to 33, 24, and 10 parts, respectively. These fractions have acid numbers of 694, 716, and 281, respectively. These analyses indicate average molecular weights of 162, 156, and 399, respectively. Alkaline solutions of all fractions show surface activity.

Example 5.—Two hundred parts of caprylic acid is reacted with ethylene under the influence of dibenzoylhydrazine as described in Example 4. Distillation of this reaction mixture yields 20 parts of an acid product boiling higher than the recovered caprylic acid and having an average molecular weight of 305. This corresponds to an acid containing an average of 19.5 carbon atoms.

Example 6.—A silver-lined pressure-resistant reaction vessel is flushed with deoxygenated nitrogen, closed and evacuated to less than 0.05 mm. of mercury, and 200 parts of isobutyric acid freshly distilled in a nitrogen atmosphere is then sucked into the evacuated vessel by means of a loading lock. The vessel is then pressured with ethylene containing about 5 parts per million of oxygen, and heated at 245° to 256° C. under 710 to 975 atmospheres ethylene pressure for 14.3 hours. The total observed pressure drop during this time amounts to 1260 atmospheres. The reaction mixture gives 89.5 parts of fatty acid mixture having an acid number of 191.6. This analysis indicates an average molecular weight of 292 and corresponds to an acid containing an average of 18.6 carbon atoms (i. e. 7.3 ethylene units per unit of isobutyric acid).

Example 7.—Two hundred parts of isobutyric acid and 0.2 part of hydrazine hydrochloride are heated in a stainless steel-lined vessel under an ethylene pressure of 850 to 990 atmospheres at 225° to 229° C. for 19.75 hours. During this period a total pressure drop of 450 atmospheres is observed. This reaction mixture yields 72 parts of recovered isobutyric acid and 136.5 parts of a higher boiling acid mixture which has an acid number of 437.3. This analysis indicates an average molecular weight of 128 and corresponds to an acid containing an average of 6.8 carbon atoms.

The products obtained in accordance with the foregoing examples are mixtures whose components are acids having the structure $$H(CH_2CH_2)_nCR_1R_2COOH,$$

where $R_1$ and $R_2$ are members of the group consisting of hydrogen, monovalent hydrocarbon groups free of olefinic and acetylenic unsaturation and carboxyl-substituted monovalent hydrocarbon groups free of olefinic and acetylenic unsaturation, and where $n$ has average values of 6 to 50 or more.

While batchwise operation has been described in the examples, the process of this invention may also be operated continuously. A convenient form of apparatus for use in the continuous process is a long tubular reactor, a portion of which is heated to the reaction temperature. The reactants, including catalyst, separately or mixed in any desired proportion, are pumped through the reactor while the product is continuously removed. In such a reactor the reactants may be preheated before being submitted to reaction conditions. If desired, the catalyst may be injected at several points throughout the reaction zone. In this manner a low and relatively constant catalyst concentration may be used, whereby the reaction velocity is readily amenable to control. Under these conditions the heat of reaction is relatively small in any portion of the reaction zone and is therefore easily removed.

It is generally preferable to maintain all the reactants in intimate contact, which may be accomplished by any method of mixing, such as by continuous stirring, turbulent flow, atomization, etc., or by efficient bubbling of the gaseous phase through the liquid phase of the reaction system.

The products of this invention are widely useful. These acid mixtures, in the form of their sodium, other alkali metal ammonium or substituted ammonium salts, show detergent, emulsifying, wetting and other surface properties. The heterogeneity of the products, which is only in respect to molecular weight, makes them superior to many similar materials prepared by other means. For example, conversion of the acids to water repellents yields products which permit the fabric to retain a fine soft hand whereas many similar products confer a hard, boardy character on the fabric. Moreover, the conversion of these acids to plasticizers and special lubricants, for example by esterification with short-chain alcohols, gives products which remain liquid at very low temperature while many similar products from more conventional sources freeze at relatively high temperatures. The products of this invention can be converted to useful waxes or wax adjuvants, for example by esterification with a long-chain alcohol or glycol, or by preparation of salts such as calcium and other alkaline earth salts as well as aluminum and zinc salts. Such compounds show a wide range of compatability with other waxes and wax solvents. The alkaline earth and heavy metal salts may further be used as grease-bodying agents, corrosion preventive ingredients and as components of water-repellent and waterproofing compositions. The alkali metal and ammonium salts of these acids are readily soluble in water and such solutions find use in detergent, emulsification, dispersion, wetting, textile dyeing and finishing applications. Many of such soaps are also easily soluble or dispersible in dry cleaning fluids such as naphtha and polychloro compounds and these solutions or dispersions are of value as drying cleaning agents. The synthetic acids obtained by the process of this invention find use per se or in the form of salts as compounding ingredients and milling aids in the processing of natural and synthetic rubbers. These also find use as antitack agents in the calendering of plastics. A particularly valuable product, of use as a water repellent, can be prepared from these acid mixtures by conversion, via the amide, to N-hydroxymethylamides. Still other types of water repellents may be made by further reaction of the N-hydroxymethylamide with a tertiary amine salt to give a high grade, permanent water-repellent finish. The long-chain acid mixtures of this invention may also be transformed by known reactions to long-chain acid chlorides, anhydrides, alcohols, sulfates, chlorides, mercaptans, nitriles and amines. The uses for which such secondary products can be manufactured are generally well known in the art. For example the acid chlorides and anhydrides are directly useful as water-repellent finishes for paper and textiles, the alcohols as wax components and as raw materials for sulfation to hard water detergents, the mercaptans as modifiers for synthetic rubber preparation and vinyl polymerizations in general, the amines as raw materials for cationic surface active agents.

We claim:

1. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent saturated aliphatic hydrocarbon groups, and carboxyl-substituted monovalent saturated aliphatic hydrocarbon groups, at a temperature within the range of 200° to 300° C. under a pressure of 100 to 2000 atmospheres, in the presence of a hydrazine compound as catalyst, whereby a mixture of long-chain fatty acids of the formula $$H(CH_2CH_2)_nR_1R_2CCOOH$$

$n$ being an integer, is obtained.

2. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent saturated aliphatic hydrocarbon groups, and carboxyl-substituted monovalent saturated aliphatic hydrocarbon groups, at a temperature within the range of 200° to 300° C., under a pressure of 100 to 2000 atmospheres, in the presence of 0.001% to 0.5% of a hydrazine compound as catalyst, whereby a mixture of long-chain fatty acids of the formula $H(CH_2CH_2)_nR_1R_2CCOOH$, $n$ being an integer, is obtained.

3. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent saturated aliphatic hydrocarbon groups, and carboxyl-substituted monovalent saturated aliphatic hydrocarbon groups, at a temperature within the range of 60° to 300° C. under a pressure of 100 to 2000 atmospheres, in the presence of a peroxy compound as catalyst, whereby a mixture of long-chain fatty acids of the formula $$H(CH_2CH_2)_nR_1R_2CCOOH$$

$n$ being an integer, is obtained.

4. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent saturated aliphatic hydrocarbon groups, and carboxyl-substituted monovalent saturated aliphatic hydrocarbon groups, at a temperature within the range of 60° to 300° C. under a pressure of 100 to 2000 atmospheres, in the presence of 0.001% to 0.5% of a peroxy compound as catalyst, whereby a mixture of long-chain fatty acids of the formula $$H(CH_2CH_2)_nR_1R_2CCOOH$$

$n$ being an integer, is obtained.

5. A process for the preparation of long-chain fatty acids which comprises reacting 1.0 part by weight of ethylene with 0.1 to 30 parts by weight of a carboxylic acid of the formula $HR_1R_2CCOOH$, $R_1$ and $R_2$ representing hydrogen, monovalent saturated aliphatic hydrocarbon groups, and carboxyl-substituted monovalent saturated aliphatic hydrocarbon groups, at a temperature within the range of 175° to 300° C. under a pressure of 100 to 2000 atmospheres, in the presence of hexachloroethane as catalyst, whereby a mixture of long-chain fatty-acids of the formula $$H(CH_2CH_2)_nR_1R_2CCOOH$$

$n$ being an integer, is obtained.

6. A process for the preparation of long-chain fatty acids which comprises reacting 0.1 part by weight of ethylene with 0.1 to 30 parts by weight of a carboxylic acid of the formula $$HR_1R_2CCOOH$$

$R_1$ and $R_2$ representing hydrogen, monovalent saturated aliphatic hydrocarbon groups, and carboxyl-substituted monovalent saturated aliphatic hydrocarbon groups, at a temperature within the range of 175° to 300° C. under a pressure of 100 to 2000 atmospheres, in the presence of 0.001% to 0.5% of hexachloroethane as catalyst, whereby a mixture of long-chain fatty acids of the formula $H(CH_2CH_2)_nR_1R_2CCOOH$, $n$ being an integer, is obtained.

7. A process for the preparation of long-chain fatty acids which comprises reacting ethylene with isobutyric acid at a temperature within the range of 175° to 300° C. under a pressure of 100 to 2000 atmospheres in the presence of hexachloroethane as catalyst, whereby a mixture containing long-chain fatty acids of the formula $H(CH_2CH_2)_nC(CH_3)_2COOH$, $n$ being an integer from 6 to 50, is produced.

8. A process for the preparation of long-chain fatty acids which comprises reacting ethylene with isobutyric acid at a temperature within the range of 60° to 300° C. under a pressure of 100 to 2000 atmospheres in the presence of a peroxy compound as catalyst, whereby a mixture containing long-chain fatty acids of the formula $H(CH_2CH_2)_nC(CH_3)_2COOH$, $n$ being an integer from 6 to 50, is produced.

9. A process for the preparation of long-chain fatty acids which comprises reacting ethylene with isobutyric acid at a temperature within the range of 200° to 300° C. under a pressure of 100 to 2000 atmospheres in the presence of a hydrazine compound as catalyst, whereby a mixture containing long-chain fatty acids of the formula $H(CH_2CH_2)_nC(CH_3)_2COOH$, $n$ being an integer from 6 to 50, is produced and thereafter separating the said mixed long-chain fatty acids from the resultant reaction mixture.

10. A process for the preparation of long-chain fatty acids which comprises reacting from 1.0 part by weight of ethylene with 0.1 to 30 parts by weight of propionic acid at a temperature within the range of 200° to 300° C. under a pressure of 100 to 2000 atmospheres in the presence of a hydrazine compound as catalyst, whereby a mixture containing long-chain fatty acids of the formula $H(CH_2CH_2)_nCH(CH_3)COOH$ is produced.

11. A process for the preparation of long-chain fatty acids which comprises reacting ethylene with propionic acid at a temperature within the range of 60° to 300° C. under a pressure of 100 to 2000 atmospheres in the presence of a catalyst of the class consisting of oxygen and peroxy compounds, whereby a mixture containing long-chain fatty acids of the formula $$H(CH_2CH_2)_nCH(CH_3)COOH$$

$n$ being an integer from 6 to 50, is produced.

12. A process for the preparation of long-chain fatty acids which comprises reacting ethylene with propionic acid at a temperature within the range of 175° to 300° C. under a pressure of 100 to 2000 atmospheres in the presence of hexachloroethane as catalyst, whereby a mixture containing long-chain fatty acids of the formula $H(CH_2CH_2)_nCH(CH_3)COOH$, $n$ being an integer from 6 to 50, is produced.

13. A process for the preparation of long-chain fatty acids which comprises reacting ethylene with a carboxylic acid of the formula $$HR_1R_2CCOOH$$

$R_1$ and $R_2$ representing hydrogen, monovalent saturated aliphatic hydrocarbon groups, and carboxyl substituted monovalent saturated aliphatic hydrocarbon groups, in the presence of a catalyst which is suitable for the homopolymerization of ethylene but ineffective for promoting the Friedel-Crafts type reaction, at a temperature within the range of 50° to 400° C. under superatmospheric pressure, whereby a product containing long-chain fatty acids of the formula $H(CH_2CH_2)_nR_1R_2CCOOH$, $n$ being an integer, is obtained, and thereafter separating from the said product a mixture comprising long-chain fatty acids of the formula $H(CH_2CH_2)_nR_1R_2CCOOH$ produced by the said reaction.

14. A process for the preparation of long-chain fatty acids which comprises reacting 1.0 part by weight of ethylene with 0.1 to 30 parts by weight of a carboxylic acid of the formula $$HR_1R_2CCOOH$$

$R_1$ and $R_2$ representing hydrogen, monovalent saturated aliphatic hydrocarbon groups and carboxyl substituted monovalent saturated aliphatic hydrocarbon groups, at a temperature within the range of 50° to 400° C. under a pressure within the range of 100 to 2000 atmospheres, in the presence of a catalyst which is suitable for the homopolymerization of ethylene but ineffective for promoting the Friedel-Crafts type reaction, whereby a product containing long chain fatty acids of the formula $H(CH_2CH_2)_nR_1R_2CCOOH$, $n$ being an integer, is obtained, and thereafter separating from the said product the resulting mixture comprising long chain fatty acids of the formula $H(CH_2CH_2)_nR_1R_2CCOOH$, produced by the said reaction.

JOHN R. ROLAND.
JESSE HARMON.

REFERENCES CITED

The following references are of record in the file of this patent:

UNITED STATES PATENTS

| Number | Name | Date |
|---|---|---|
| 1,951,747 | Brezinski | May 20, 1934 |
| 2,032,159 | Whitmore | Feb. 25, 1936 |
| 2,079,652 | Davis | May 11, 1937 |
| 2,093,695 | Larson | Sept. 21, 1937 |
| 2,174,985 | Lazier | Oct. 3, 1939 |
| 2,395,292 | Peterson | Feb. 19, 1946 |